(12) United States Patent
Ogawa et al.

(10) Patent No.: US 7,042,669 B2
(45) Date of Patent: May 9, 2006

(54) METHOD AND APPARATUS FOR RECORDING/REPRODUCING MAGNETIZATION INFORMATION

(75) Inventors: Susumu Ogawa, Fujimi (JP); Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 10/788,437

(22) Filed: Mar. 1, 2004

(65) Prior Publication Data
US 2005/0128886 A1 Jun. 16, 2005

(30) Foreign Application Priority Data
Sep. 29, 2003 (JP) ............... 2003-338530

(51) Int. Cl.
*G11B 5/02* (2006.01)
(52) U.S. Cl. .......................... 360/55; 369/126
(58) Field of Classification Search .......... 360/55, 360/75, 8, 18, 27, 59; 427/535; 250/234, 250/216; 257/295; 365/173, 151; 369/13.35, 369/126, 120, 13.01, 13.56
See application file for complete search history.

(56) References Cited

U.S. PATENT DOCUMENTS

| | | | | |
|---|---|---|---|---|
| 5,322,716 | A * | 6/1994 | Takahashi et al. | 427/535 |
| 5,793,711 | A * | 8/1998 | Bojarczuk et al. | 369/13.35 |
| 6,046,448 | A * | 4/2000 | Sato et al. | 250/234 |
| 6,480,412 | B1 * | 11/2002 | Bessho et al. | 365/173 |
| 6,605,836 | B1 * | 8/2003 | Kishi et al. | 257/295 |
| 6,949,732 | B1 * | 9/2005 | Kiguchi et al. | 250/216 |

FOREIGN PATENT DOCUMENTS

| | | |
|---|---|---|
| JP | 5-250735 | 9/1993 |
| JP | 11-73906 | 3/1999 |
| JP | 2000-215627 | 8/2000 |
| JP | 2001-196661 | 7/2001 |

OTHER PUBLICATIONS

Mattsonet et al, Phys. Rev. Lett., 71, 185 1993.
Chun-Yoel Youi et al, J. App. Phys. 87, 5215, 2000.
Stefan Grafstrom, Appl. Phys. Rev., 91, 1717, 2002.

* cited by examiner

*Primary Examiner*—David Hudspeth
*Assistant Examiner*—Fred F. Tzeng
(74) *Attorney, Agent, or Firm*—Mattingly, Stanger, Malur & Brundidge, P.C.

(57) ABSTRACT

An information storage device having a hard disk has a metal probe that is brought closely to the surface of a multilayer film that includes a magnetic metal layer, a non-magnetic metal layer, and a magnetic metal layer up to a nano-meter order distance from the surface. The distance between the metal probe and the surface of the multilayer film, as well as the voltage to be applied are changed to change the state of the quantum well generated in the multilayer film, thereby changing the magnetizing direction relatively between the two magnetic metal layers. To read magnetization information from the hard disk, a change of an optically induced tunnel current is used. The change of the tunnel current is caused by a change of a plasmon resonance energy according to a relative change of the magnetizing direction between the magnetic metal layers.

15 Claims, 14 Drawing Sheets

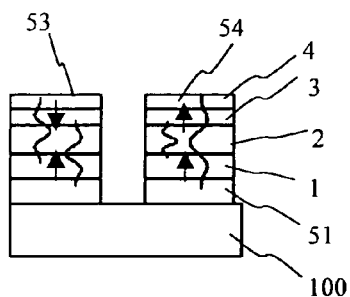
FIG. 17A
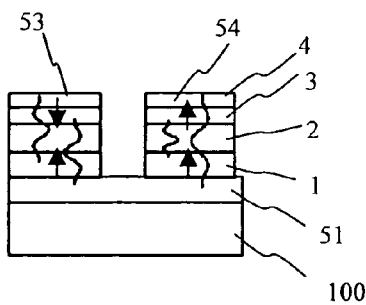
FIG. 17B
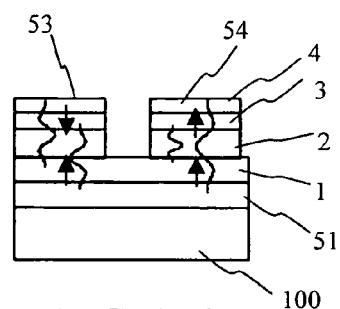
FIG. 17C
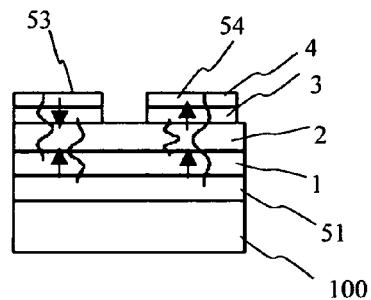
FIG. 17D
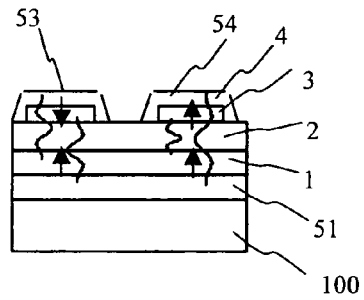
FIG. 17E
FIG. 18
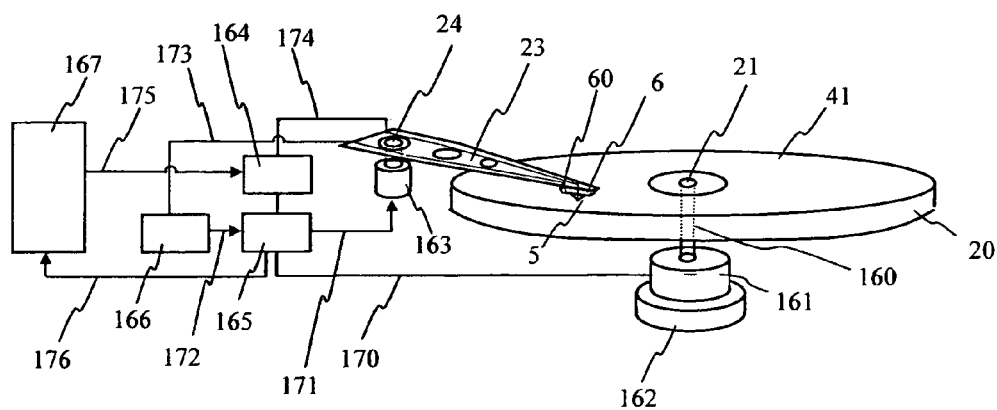

METHOD AND APPARATUS FOR RECORDING/REPRODUCING MAGNETIZATION INFORMATION

FIELD OF THE INVENTION

The present invention relates to a method and apparatus for recording/reproducing magnetization information, more particularly to a new method and apparatus for recording/reproducing magnetization information, preferred for high density recording.

BACKGROUND OF THE INVENTION

Conventionally, a magnetic head has been used to write magnetization information in a hard disk drive (HDD). The magnetic head uses a magnetic field generated from a coil. And, the HDD recording density has been required to become higher and higher. As known well, when an HDD magnetic head becomes minute such way to meet the recording domain that becomes minute more and more as a result of achievement of such high density recording, the magnetic field to be generated from the magnetic head becomes weak under the influence of anti-magnetic field components generated from the tip of the magnetic head. In addition, if the recording domain becomes minute such way, the magnetizing direction written in the recording domain becomes thermally unstable and the material of the recording medium comes to be required to become higher in magnetic anisotrophy to overcome the thermally unstable state. Therefore, the HDD recording head also comes to be required to generate a higher writing magnetic field. This is why it has been expected to develop another writing method to be employed for writing magnetization information in such very high density recording operations instead of using the conventional magnetic head. On the other hand, it is also known well that the conventional magnetization information writing method that uses a current causes the power consumption to increase due to the minuteness of the recording domain even in fixed memories represented by the random access memory (MRAM) that employs a non-volatile magnetization method. And, in order to solve such conventional problems, there has been proposed a writing method that makes good use of the spin injection magnetization inverting instead of those magnetization information writing methods that have used a current respectively. The proposed method injects spin-polarized electrons into the subject magnetic material to invert the object magnetization area, thereby writing magnetization information therein. However, because the writing current threshold value is as high as $10^7 A/cm^2$, the method is also required to be more improved for power consumption.

There is also proposed another writing method, which is a magnetization controlling method that uses an electrical field. For example, the method described in the non-patent document 1 controls the exchange interaction to occur between two ferromagnetic ferromagnetic metal layers by controlling the carrier density in the subject semiconductor layer using an electrical field. The semiconductor layer is structured as a laminated film consisting of a ferromagnetic metal layer, a semiconductor layer, and another ferromagnetic metal layer and the method controls the magnetization state of each of the ferromagnetic metal layers. In another writing method described in the non-patent document 2, the recording medium is provided with an insulating layer in the three-layer structure consisting of a ferromagnetic metal layer, a non-magnetic metal layer, and another ferromagnetic metal layer just like the above laminated layer consisting of a ferromagnetic metal layer, a non-magnetic metal layer, an insulating layer, and another ferromagnetic metal layer, then applies a voltage between the two ferromagnetic metal layers to control the exchange interaction to be generated between those ferromagnetic metal layers, thereby controlling the magnetization state in each of them. On the other hand, the writing method described in the patent document 1 provides a semiconductor layer outside the three-layer laminated film structure consisting of a ferromagnetic metal layer, a non-magnetic metal layer, and a ferromagnetic metal layer to control both width and height of a Schottky barrier to be generated at the phase boundary between each ferromagnetic metal layer and the semiconductor layer with use of an electrical field, thereby controlling the exchange interaction to occur between the ferromagnetic metal layers and cause the state of magnetization to be inverted.

Each of those magnetization information controlling techniques that use an electrical field respectively enables high density recording with low power consumption and they will become favorable techniques in the future. In that connection, there are also other well-known general methods for controlling a position from the surface of a metal probe usually with use of a tunnel current, an optical lever (disclosed in the patent document 2), etc. respectively.

On the other hand, in order to read magnetization information written in a recording medium, an element that employs the GMR (Giant Magneto-Resistance) effect is used. However, because the recording unit is becoming minute more and more due to the requirement of high density recording, such elements are also required to be improved more in sensitivity and reduced in distance from the subject recording medium. And, because the element film of the conventional GMR element cannot be reduced in film thickness, it is difficult for the element to reduce the distance from the recording medium. On the other hand, the element that employs the TMR (Tunneling Magneto-Resistance) effect and is expected to become more sensitive is also doubtful about whether it can stand the GHz level operation, since its resistance itself is large and it employs the tunnel effect. This is why the development of another new reading method has been expected.

The patent document 3 discloses a method for reading magnetization information by detecting a light emission from the recording medium. On the recording medium are disposed a probe electrodes so that they face each other and the applied voltage between the probe and the medium induces the light emission. Those magnetization information techniques that use a metal probe respectively are considered to be favorable as techniques for reproducing nm-order information.

Although it is not a magnetization information detecting technique, it is well known that if a light beam is irradiated on a metal surface while a metal probe is brought closer to the surface, the tunnel current increases there. For example, the non-patent document 3 discloses a phenomenon that if a light beam is irradiated between a metal surface and a metal probe to cause plasmon excitation there, a large direct current flows between them.

[Patent document 1] Official gazette of JP-A No. 196661/2001

[Patent document 2] Official gazette of JP-A No. 73906/1999

[Patent document 3] Official gazette of JP-A No. 250735/1993

[Patent document 4] Official gazette of JP-A No. 215627/2000

[Non-patent document 1] Mattsonet et al, Phys. Rev. Lett. 71, 185(1993)

[Non-patent document 2] Chun-Yoel Youi et al., J. Appl. Phys., 87, 5215(2000)

[Non-patent document 3] Stefan Grafström, Appl. Phys. Rev, 91, 1717(2002).

SUMMARY OF THE INVENTION

It is possible to read a relative magnetization direction by a tunneling current through a probe electrode which is disposed on the recording medium, when the recording medium consists of three layered structure including the first ferromagnetic metal layer, non-magnetic metal layer, and the second ferromagnetic metal layer. Because the electronic structure depends on the parallel and antiparallel magnetic directions in the three layered structure, STS (Scanning Tunneling Spectroscopy) profile is different, and it is possible to distinguish the parallel and antiparallel magnetic directions through the tunneling current. The method employing an ordinary STS technique, the measured current is usually about nA when the distance between the metal probe and the surface of the recording medium is about 1 nm. On the other hand, in the case of a terabyte level HDD, the magnetization information reading speed is required to be at least about 1 GHz ($10^9$ times/s). In the case of such a detecting method as the STS technique, which uses a tunnel current, shot noise generation is unavoidable theoretically. For example, if the operation speed is 1 GHz and the S/N ratio is 20 dB, then the tunnel current is required to be μA or so to obtain an S/N ratio of 20 dB. The measurement current increases by bringing the metal probe closer to the surface of the recording medium. In that case, however, the metal probe might come into contact with the surface of the recording medium, thereby the metal probe might be deformed/damaged.

Under such circumstances, it is an object of the present invention to provide a new magnetization information detecting method capable of reading written magnetization information at a GHz level operation speed while the metal probe is separated as far as possible from the surface of the object recording medium.

The magnetization state writing method of the present invention uses a metal probe disposed so as to face the surface of a medium that includes a multilayer film consisting at least three layers of a ferromagnetic metal layer, a non-magnetic metal layer, and another ferromagnetic metal layer to control the magnetization state in the medium. The three-layered film may be covered by a protection film, for example, an Au film. If the metal probe is put close to the multilayer film or an electrical field is applied to the multilayer film, the image potential of the surface of the multilayer film can be modulated. And, this modulation of the image potential causes the quantum well energy formed in the multilayer film to be changed. Consequently, the positive/negative state of the exchange interaction that works between the two ferromagnetic metal layers, that is, the relative magnetization state in the multilayer film can be changed.

After that, a light beam is irradiated between the multilayer film and the metal probe to read the magnetization information written in the multilayer film. Because the plasmon resonance frequency in the multilayer film differs according to whether the magnetizing directions of the two ferromagnetic metal layers of the multilayer film are parallel or antiparallel, it is possible to control whether to generate plasmon resonance between the metal probe and the multilayer film by selecting a proper wavelength of the incident light beam. If plasmon is excited between the metal probe and the multilayer film, the tunnel current value increases by three figures or so. Consequently, a tunnel current enough to stand GHz level reading is obtained. And, whether the magnetizing directions in the multilayer film are parallel or antiparallel can also be read by measuring the strength and/or polarization change of the light beam emitted from the plasmon excited at the tip of the metal probe.

In other words, the magnetization information recording/reproducing method of the present invention includes a step of positioning the metal probe so as to make it face a multilayer film consisting of a first ferromagnetic metal layer, a nonmagnetic metal layer formed on the first ferromagnetic metal layer, and a second ferromagnetic metal film formed on the nonmagnetic metal layer; a step of applying a voltage between the multilayer film and the metal probe to generate magnetization in an area of the multilayer film facing the metal probe according to the applied voltage, thereby writing magnetization information therein; a step of irradiating a light beam between the metal probe and the multilayer film to induce plasmon there while detecting the tunnel current flowing between the metal probe and the multilayer film; and a step of reading the magnetization information from the multilayer film according to the detected tunnel current.

The wavelength of the light beam irradiated between the metal probe and the multilayer film may be a wavelength that causes plasmon resonance when magnetizing directions of the first and second ferromagnetic metal layers are parallel to each other or a wavelength that causes plasmon resonance when magnetizing directions of the first and second ferromagnetic metal layers are antiparallel to each other.

The wavelength of the light beam irradiated between the metal probe and the multilayer film may be modulated by a fixed frequency within a range between the wavelength that causes plasmon resonance when magnetizing directions of the first and second ferromagnetic metal layers are parallel to each other and the wavelength that causes plasmon resonance when the first and second ferromagnetic metal layers are antiparallel to each other. In that connection, phase sensitive detection of the tunnel current can be made by the modulation frequency to read magnetization information from the multilayer film.

The magnetization information recording/reproducing apparatus of the present invention includes a recording medium that includes a multilayer film consisting of a first ferromagnetic metal layer, a non-magnetic metal layer formed on the first ferromagnetic metal layer, and a second ferromagnetic metal layer formed on the non-magnetic metal layer; a metal probe disposed so as to face the recording medium; voltage applying means for applying a voltage between the metal probe and the recording medium; and light beam irradiating means for irradiating a light beam between the metal probe and the recording medium.

The light irradiating means can have means for irradiating a light beam having a wavelength that causes plasmon resonance when the magnetizing directions of the first and second ferromagnetic metal layers are parallel to each other or a wavelength that causes plasmon resonance when the magnetizing directions of the first and second ferromagnetic metal layers are antiparallel to each other and detecting the tunnel current flowing between the metal probe and the recording medium. In that connection, the polarization of the light beam to be irradiated may be modulated by a fixed frequency to detect the modulation frequency component of the detected tunnel current.

The light irradiating means should modulate the wavelength of the light beam to be irradiated with a fixed frequency within a range between the wavelength that causes plasmon resonance when the magnetizing directions of the first and second ferromagnetic metal layers are parallel to each other and the wavelength that causes plasmon resonance when the magnetizing directions of the first and second ferromagnetic metal layers are antiparallel to each other. And, the light beam irradiating means may be provided with means for detecting the tunnel current flowing between the metal probe and the recording medium and means for enabling phase sensitive detection of the detected tunnel current with the modulation frequency.

Therefore, according to the present invention, it is possible to obtain a method and apparatus for realizing non-contact high density recording/detecting of magnetization information at low power consumption.

BRIEF DESCRIPTION OF THE DRAWINGS

FIGS. 17A, 17B, 17C, 17D, and 17E show other structures of the recording medium provided with a plurality of nano-pillars;

FIG. 18 is a concept block diagram of a magnetic recording device of the present invention;

DETAILED DESCRIPTION OF THE PREFERRED EMBODIMENTS

Hereunder, the principles of the magnetization information detection by using a metal probe, as well as the preferred embodiments of the present invention will be described with reference to the accompanying drawings. In all of the accompanying drawings, the same numerals will be used for the same functional parts.

[First Embodiment]

Figure 1:
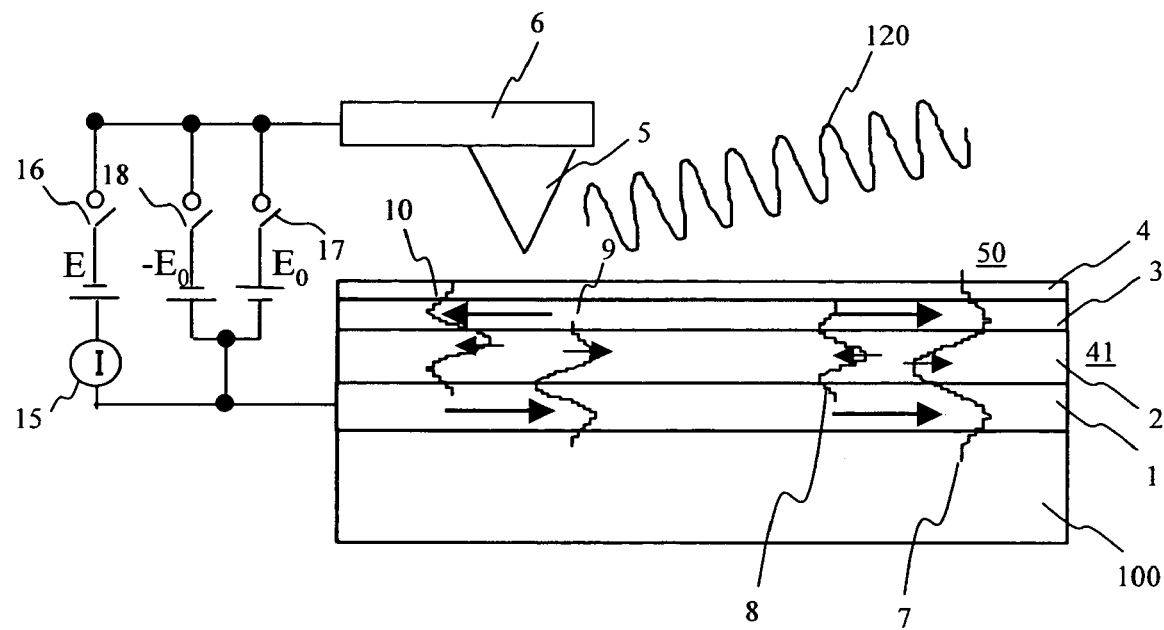
FIG. 1 is a concept chart for describing an example of a magnetization information recording/reproducing apparatus of the present invention.

FIG. 1 shows a concept chart for describing a magnetization information recording/reproducing apparatus of the present invention. This apparatus is mainly configured by a magnetic recording medium 50, a metal probe 5 disposed so as to face the medium 50, and an irradiation light beam 120.

The magnetic recording medium 50 is configured by a multilayer film 41 formed by laminating a ferromagnetic metal layer 1, a nonmagnetic metal layer 2, a ferromagnetic metal layer 3, and a protection film 4 sequentially on a substrate 100. The metal probe 5 is disposed so as to face the surface of the protection film 4 with a 1 nm order gap therebetween. The metal probe 5 is held by a slider mechanism 6 structured just like that of a hard disk drive. At this time, a tunnel current may be used as a feedback signal for controlling the distance (gap) between the protection film 4 and the metal probe 5. The feedback signal may also be generated using an optical lever method used in an ordinary atomic force microscope. A distance controlling probe may also be provided separately from the metal probe 5 used to control the electrical field to be described below.

The ferromagnetic metal layers 1 and 3 included in the multilayer film 41 may be formed with such a single ferromagnetic metal as Fe, Co, Ni, or the like or such an alloy as CoFe, NiFe, CoNi, or the like. The non-magnetic metal layer 2 may be formed with such a metal as Au, Ag, Cu, Pt, Pd, or the like. The protection layer 4 may be formed with such a non-magnetic precious metal as Au. The protection layer 4 may also be omitted. In this embodiment, Fe is used for the ferromagnetic metal layers 1 and 3, Au is used for the non-magnetic metal layer 2, and Au is used for the protection film 4.

The sp-like electrons at the Fermi level or so in the multilayer film 41 are localized in the film 41 itself, so that various types of quantum well states 7 to 10 as shown in FIG. 1 explanatorily are formed according to how they are blocked in there.

The right half of FIG. 1 shows that the magnetizing directions of the ferromagnetic metal layers 1 and 3 are parallel to each other as shown by long arrows. In that case, the electrons having an electron spin as shown by short arrows that are not in parallel to the magnetizing directions are almost localized in the non-magnetic metal layer 2 as shown by a reference numeral 8. On the other hand, the electrons having the spin as shown in short arrows that are in parallel to the magnetizing directions are localized wholly in the multilayer film 41 as shown by a reference numeral 7.

The left half of FIG. 1 shows that the magnetizing directions of the ferromagnetic metal layers 1 and 3 are antiparallel to each other. In that case, the state of the electrons depends on their spin and the electrons are localized in the films 1 and 2 as shown by a reference numeral 9 or in the films 2 to 3 as shown by a reference numeral 10.

The state of the electrons that form those quantum wells depends on the relative magnetizing directions of the ferromagnetic metal layers 1 and 3, as well as sensitively on the state of the surface of the multilayer film 41 (protection film 4). If the metal probe 5 is brought closely to the surface of the protection film 4, which is the surface of the multilayer film 41, the image potentials of the protection film 4 and the metal probe 5 are overlapped with each other, thereby the effective potential that blocks up the quantum well electrons is deformed.

In the magnetization information recording/reproducing apparatus of the present invention, a voltage $E_0$ or $-E_0$ can be applied between the multilayer film 41 and the metal probe 5 while the distance between the surface of the protection film 4 and the metal probe 5 is kept at a predetermined value. In other words, if a switch 17 or 18 is turned on selectively to apply the voltage $E_0$ or $-E_0$ between the multilayer film 41 and the metal probe 5, the blocking-up potential on the surface of the protection film 4 changes. As a result, the environmental condition for blocking up the quantum well electrons changes, thereby the energy level of the electrons in the quantum well also changes. And, when the energy level of the quantum well electrons changes such way, the magnetizing directions of the ferromagnetic metal layers 1 and 3 come to change relatively, thereby magnetization information is recorded according to whether the magnetizing directions of those layers 1 and 3 are parallel or antiparallel to each other. If the combination of the ferromagnetic metal layers 1 and 3/the nonmagnetic metal layer 2 is Co/Pd, Co/Pt, or Fe/Pt, their magnetizing directions become vertical to the film surface. However, the quantum well level can also be controlled similarly for both of the layers.

Magnetization information written in the multilayer film 41 can be read by turning on a switch 16 to apply a voltage E ($|E|<<|E_0|$) between the multilayer film 41 and the metal probe 5, then using the tunnel current 15 flowing between the metal probe 5 and the multilayer film 41. This is because the energy level of the electrons in the quantum well formed in the multilayer film 41 changes in accordance with whether the magnetizing directions of the ferromagnetic metal layers 1 and 3 are parallel or antiparallel to each other, thereby the tunnel current measured at a fixed voltage E changes according to those magnetizing directions.

When reading magnetization information from a multilayer film using such a tunnel current, a light beam 120 irradiated from a semiconductor laser is applied around a portion between the metal probe 5 and the protection film 4. Then, a proper energy of the incident light beam 120 is selected to excite the plasmon between the metal probe 5 and the protection film 4.

Figure 2:
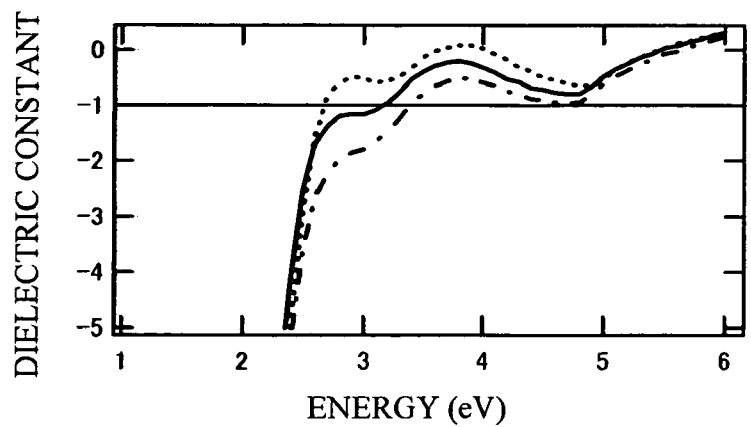
FIG. 2 is a graph for describing an example of how to calculate a change of the real part of a dielectric function and a change of a plasmon energy to be caused by a change of a quantum well level energy in a multilayer film.

FIG. 2 shows a graph for describing an estimated change of the real part of an dielectric function of the protection film 4 when the energy level of the electrons in the quantum well formed in the protection film 4 goes up/down by 0.1 eV in accordance with whether the magnetizing directions of the ferromagnetic metal layers 1 and 3 are parallel or antiparallel to each other. The protection film 4 is made of Au. The solid line in FIG. 2 shows the real part of the bulk Au dielectric function. However, the real part of the dielectric function changes as shown by a dotted line or alternate long and short dash line when the electrons in the quantum well formed in the protection film 4 goes up/down by 0.1 eV in accordance with whether the magnetizing directions of the ferromagnetic metal layers 1 and 3 are parallel or antiparallel to each other. The energy with which the real part of the dielectric function becomes −1 comes to cause surface plasmon resonance. The graph shown in FIG. 2 shows that if the energy of the quantum well level goes up/down by −0.1 to 0.1 eV, the resonance energy changes significantly, for example, from 2.6 to 3.4 eV.

Figure 3:
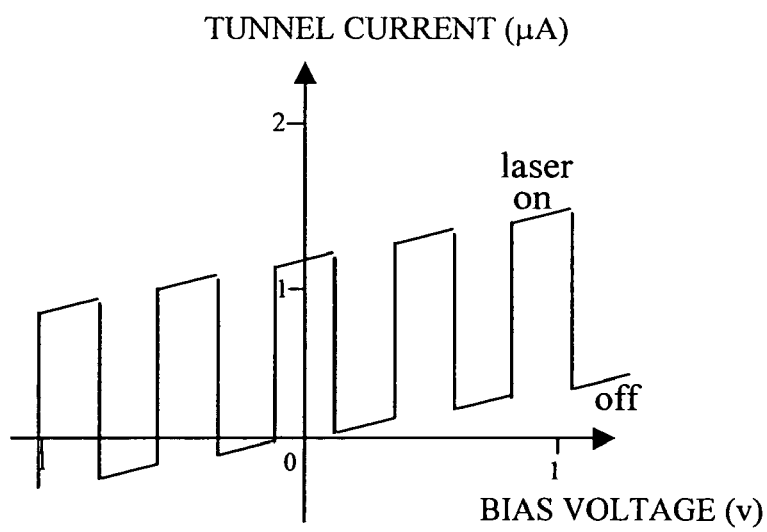
FIG. 3 is a graph for describing changes of a tunnel current flowing between a metal probe and the multilayer film when light beam irradiation is turned on/off.

FIG. 3 shows a graph for describing a function of the bias voltage E between the metal probe 5 and the protection film 4; the function denotes a tunnel current value assumed when the energy of the incident light beam 120 is set around the plasmon resonance energy. When the incident light beam 120 is turned on, the tunnel current increases more than when the incident light beam is turned off. Particularly, the tunnel current increases by about 3 figures when the bias voltage E is about 0V. And, when the incident light beam 120 is turned on, an nA level tunnel current can be amplified up to a μA level.

Figure 4:
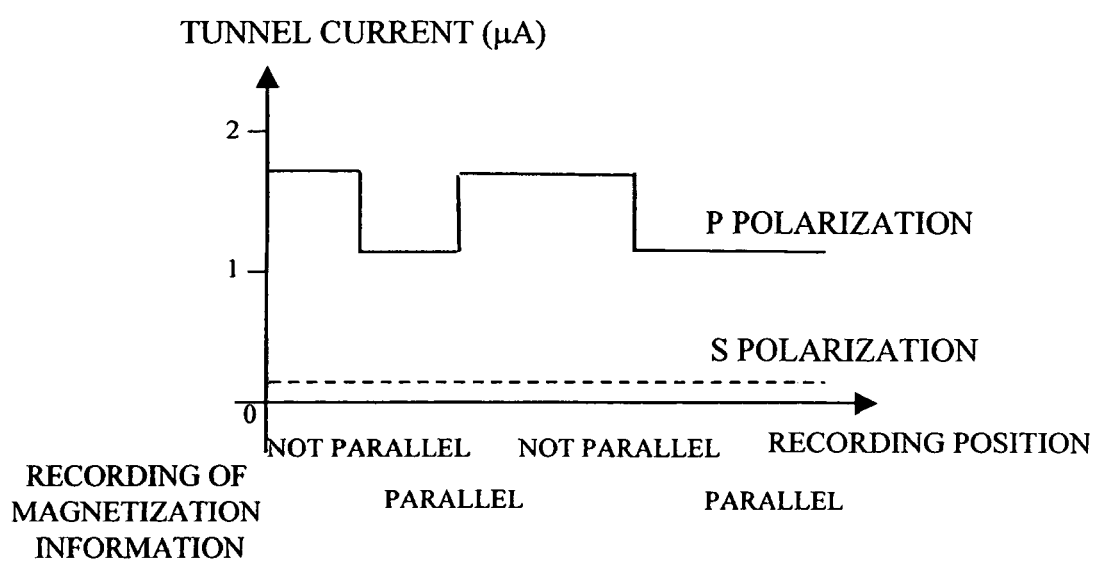
FIG. 4 is a graph for describing a change of the tunnel current to be caused by whether the magnetizing directions of recorded magnetization information are parallel or antiparallel to each other.

FIG. 4 shows a graph for describing a function of a recording position; the function denotes a change of the tunnel current 15 when the energy of the incident light beam 120 is set as a plasmon resonance energy while the magnetizing directions of the ferromagnetic metal layers 1 and 3 are antiparallel to each other. As shown in FIG. 2, because the plasmon resonance energy changes in accordance with whether the magnetizing directions of the ferromagnetic metal layers 1 and 3 are parallel or antiparallel to each other, the value of the tunnel current 15 comes to change in accordance with the magnetizing directions of the ferromagnetic metal layers 1 and 3 that are antiparallel to each other. In FIG. 4, because the energy of the incident light beam 120 is set so that the plasmon resonance occurs when the magnetizing directions of the ferromagnetic metal layers 1 and 3 are antiparallel to each other, the tunnel current increases when those magnetizing directions are antiparallel to each other. However, the energy of the incident light beam 120 may also be set so that the plasmon resonance occurs when the magnetizing directions of the ferromagnetic metal layers 1 and 3 are parallel to each other. In that connection, the tunnel current 15 comes to increase when those magnetizing directions are parallel to each other.

Figure 5:
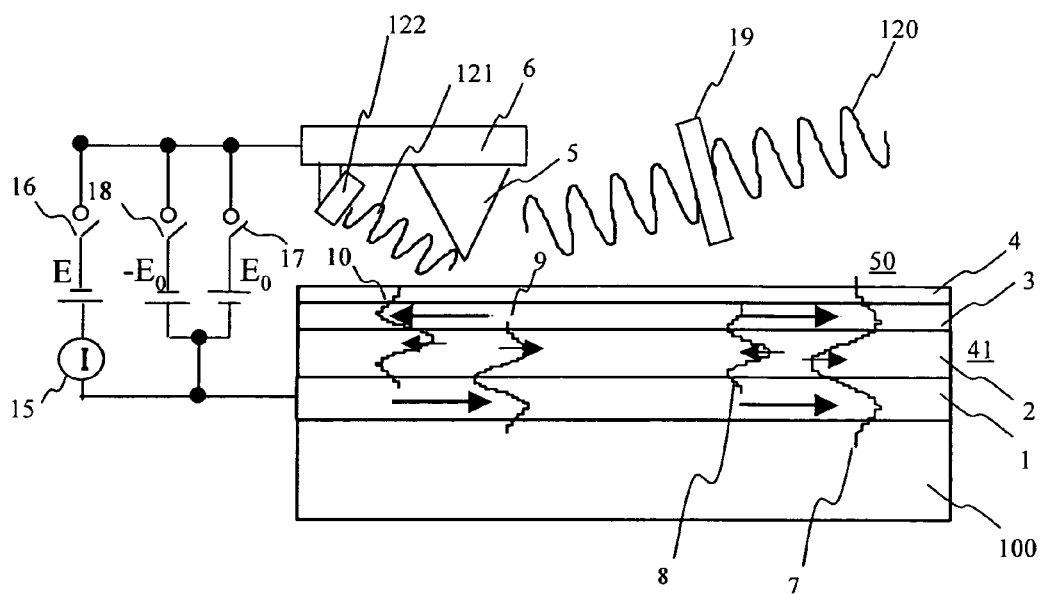
FIG. 5 is a circuit diagram of the magnetization information recording/reproducing apparatus provided with a polarizing plate for controlling polarization of an incident light beam.

As shown in FIG. 5, a polarizing plate 19 may be provided in the path of the incident light beam 120 to control the polarizing direction of the incident light beam 120. An increase of the tunnel current 15 is observed remarkably when the incident light beam 120 is polarized axially to the metal probe 5 (P polarization). If the incident light beam 120 is polarized vertically to the axis of the metal probe 5 (S polarization), the tunnel current 15 does not increase effectively so much. In the case of the P polarization (axially to the axis of the metal probe 5), it is possible to read the recorded magnetizing direction at a μA level tunnel current and read GHz level information at an S/N ratio of 20 dB or so. In that case, it is also possible to obtain the same effect as the tunnel current detection even when a photo detector 122 is used to detect the strength 121 of the light emitted from the plasmon generated between the tip of the metal probe 5 and the multilayer film 41.

Figure 6:
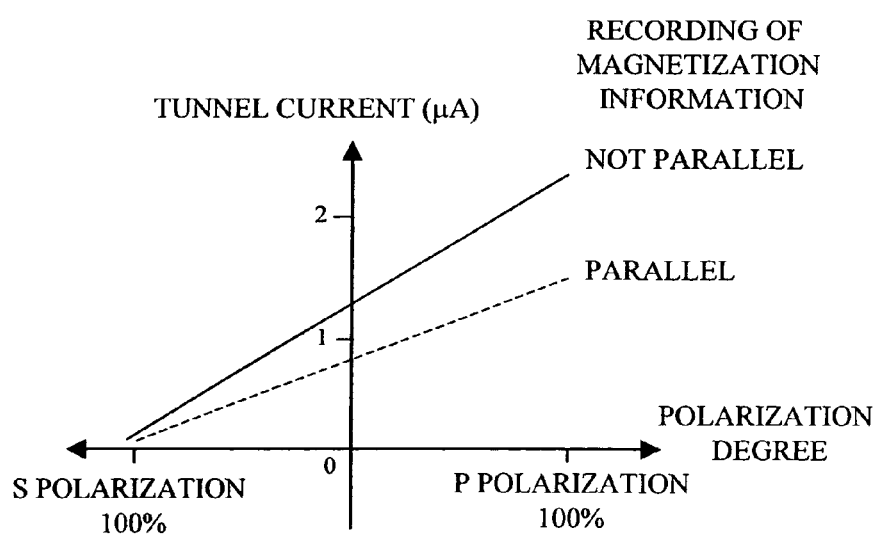
FIG. 6 is a graph for describing changes of a tunnel current denoted as a function of an incident light beam polarization degree in accordance with whether the magnetizing directions of recorded magnetization information are parallel or antiparallel to each other.

FIG. 6 shows a graph for describing the value of the tunnel current flowing between the metal probe 5 and the protection film 4 as a function of the polarizing direction of the incident light beam 120. In this case, the wavelength of the incident light beam 120 is selected so that plasmon resonance occurs when the magnetizing directions of the ferromagnetic metal layers 1 and 3 are antiparallel to each other at the time of recording. At this time, the plasmon resonance causes the tunnel current to flow more than when the magnetizing directions are parallel to each other.

Figure 7:
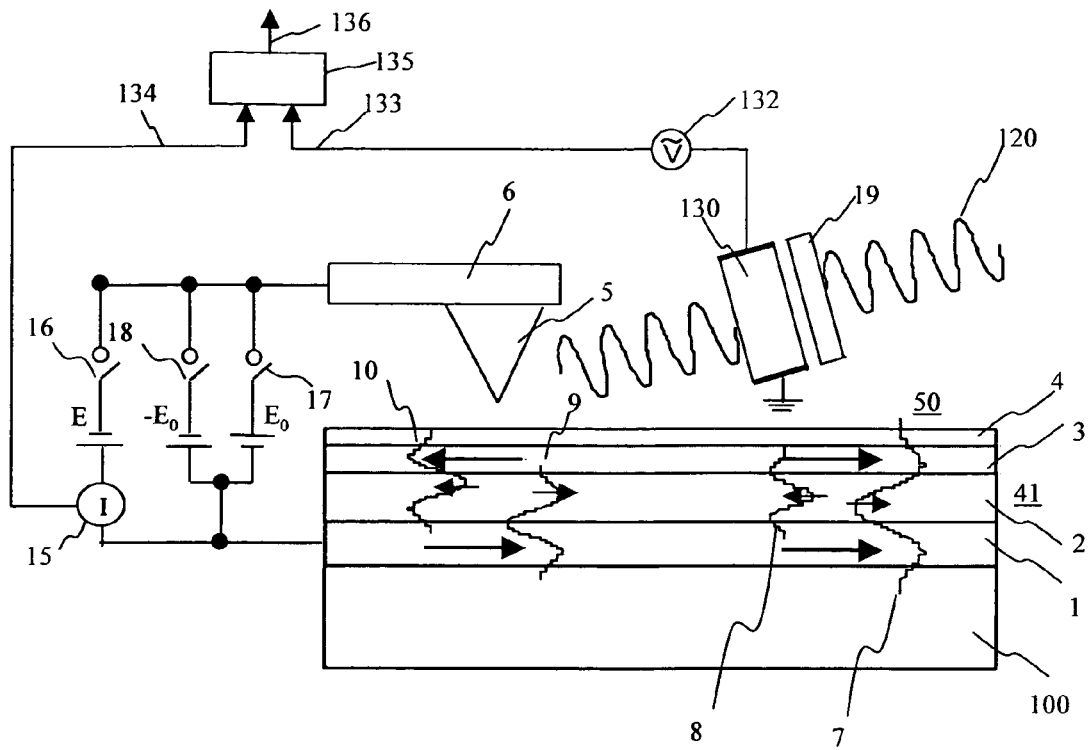
FIG. 7 is a circuit diagram of the apparatus provided with a Pockels cell for modulating polarization of an incident light beam.

As shown in FIG. 7, the linearly polarized light beam that passes the polarizing plate 19 can be polarized by 90° with a half-wavelength voltage applied to a Pockels cell 130. An output of an AC power source 132 is applied to the Pockels cell 130 to modulate the polarization state of the incident light beam 120 at that time while the modulation frequency component 136 of the tunnel current 134 is detected by a lock-in amplifier 135. As to be understood from FIG. 6, the tunnel current changes more when the magnetizing directions of the layers 1 and 3 are antiparallel to each other than when those magnetizing directions are parallel to each other. Consequently, the lock-in amplifier 135 that receives a reference frequency input 133 from the AC power source 132 can be used to detect such a change of the tunnel current 134 in the modulation frequency, thereby the magnetizing direction when in recording can be detected at a more favorable S/N ratio.

Figure 8:
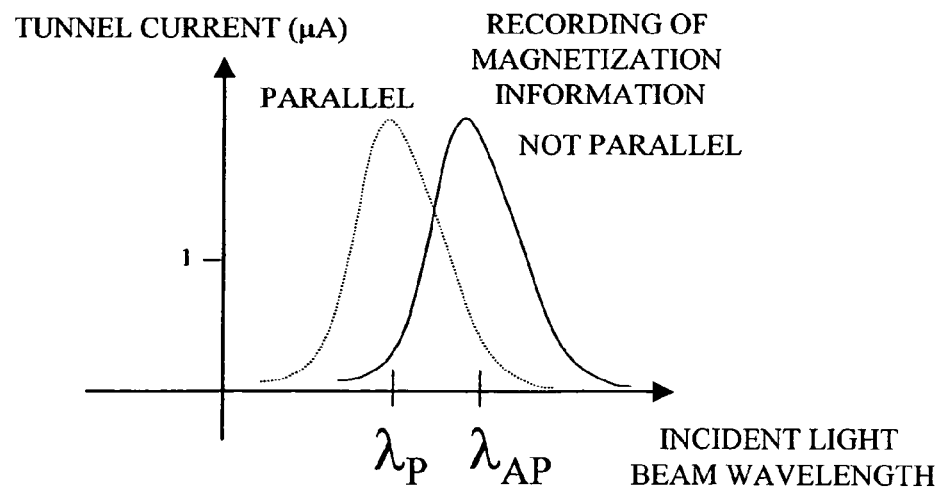
FIG. 8 is a graph for describing changes of a tunnel current denoted as a function of an incident light beam wavelength in accordance with whether the magnetizing directions of recorded magnetization information are parallel or antiparallel to each other.
Figure 9:
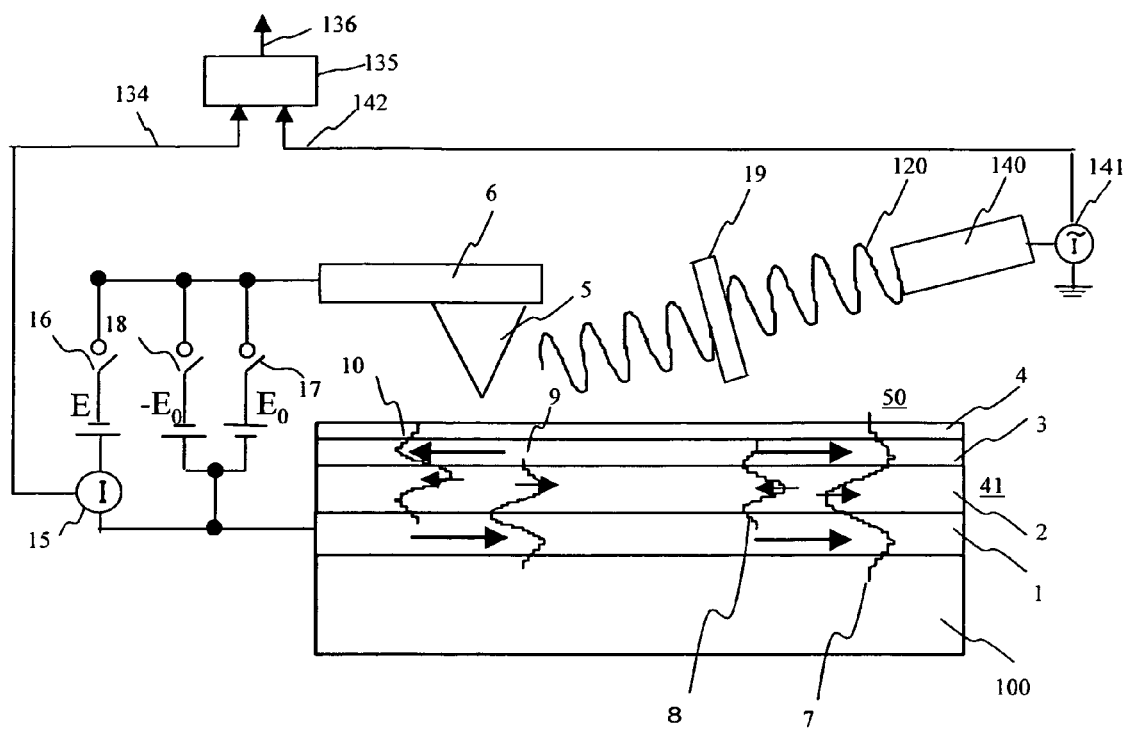
FIG. 9 is a circuit diagram of the apparatus provided with a mechanism for modulating the wavelength of an incident light beam.

FIG. 8 shows a graph for describing a value of the tunnel current flowing between the metal probe 5 and the protection film 4 as a function of the wavelength of the incident light beam 120. At this time, $\lambda_{AP}$ is defined as a wavelength that causes plasmon resonance when the magnetizing directions of the layers 1 and 3 for recording are antiparallel to each other and $\lambda_P$ is defined as a wavelength that causes plasmon resonance when the magnetizing directions of the layers 1 and 3 for recording are parallel to each other. And, as shown in FIG. 9, an injection current modulation source 141 is used to modulate the wavelength of the light beam 120 irradiated from a wavelength modulation laser 140 while the modulation frequency component 136 of the tunnel current is detected by the lock-in amplifier 135. The wavelength of the incident light beam 120 is modulated between $\lambda_{AP}$ and $\lambda_P$. The wavelength to be modulated may be by 1 nm or so between $\lambda_{AP}$ and $\lambda_P$. At that time, as shown in FIG. 8, when the magnetizing directions of the layers 1 and 3 are antiparallel to each other, the increase/decrease of the tunnel current is reversed from that of the tunnel current when the magnetizing directions of the layers 1 and 3 are parallel to each other. This is why the magnetizing direction for recording can be detected at a high S/N ratio by detecting such an increase/decrease of the tunnel current in the modulation frequency.

[Second Embodiment]

Figure 10:
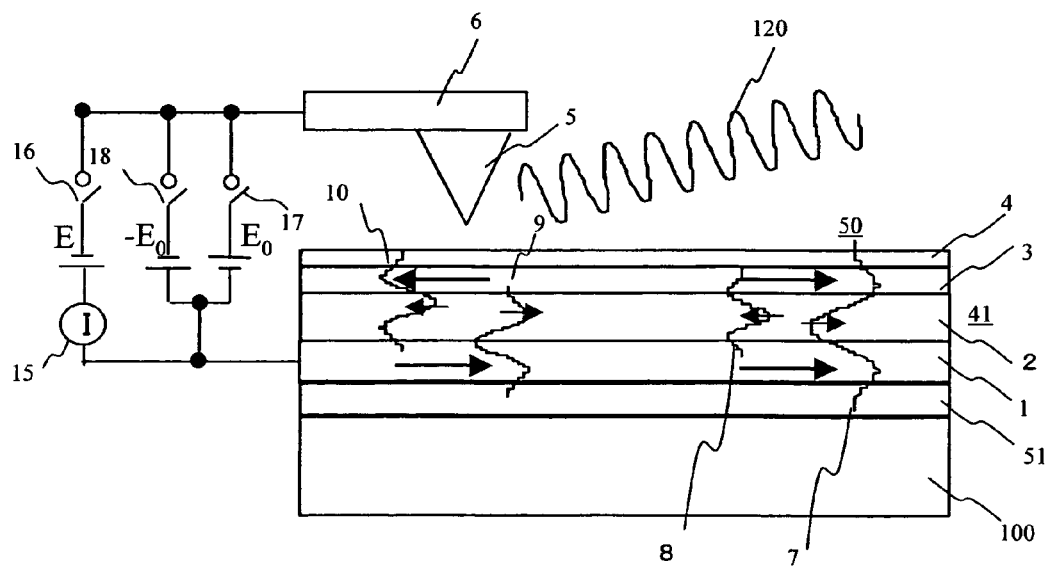
FIG. 10 is another concept chart of the magnetization information recording/reproducing apparatus of the present invention.

FIG. 10 shows a concept chart of the magnetization information recording/reproducing apparatus in another embodiment of the present invention. Unlike the magnetic recording medium 50 shown in FIG. 1, the magnetic recording medium 50 in this second embodiment shown in FIG. 10 includes an anti-ferromagnetic layer 51 formed between the substrate 100 and the ferromagnetic metal layer 1 in addition to the multilayer film 41 consisting of a ferromagnetic metal layer 1, a nonmagnetic metal layer 2, a ferromagnetic metal layer 3, and a protection film 4 laminated sequentially on the substrate 100. This is a difference between those media 50.

Even in this second embodiment, the state of the quantum well electrons is the same as that in the first embodiment. And, as shown in the right half of FIG. 10, if the magnetizing directions of the ferromagnetic metal layers 1 and 3 are parallel to each other, the electrons having an electronic spin in the opposite magnetizing direction of those of the layers 1 and 3 are almost blocked up in the nonmagnetic metal layer 2 as shown by a reference numeral 8. The electrons having an electronic spin in the same magnetizing direction as those of the layers 1 and 3 are blocked up wholly in the multilayer film 41 as shown by a reference numeral 7. On the other hand, as shown in the left half of FIG. 10, if the magnetizing directions of the ferromagnetic metal layers 1 and 3 are antiparallel to each other, the state of the electrons depends on the spin direction and those electrons come to be localized in the films 1 and 2 as shown by reference numeral 9 or in the films 2 to 3 as shown by reference numeral 10.

In this second embodiment, because the anti-ferromagnetic layer 51 is formed, the magnetizing direction of the ferromagnetic metal layer 1 is fixed. This is a difference from the first embodiment. However, both writing and reading operations using the metal probe 5 are the same as those in the first embodiment.

[Third Embodiment]

Figure 11:
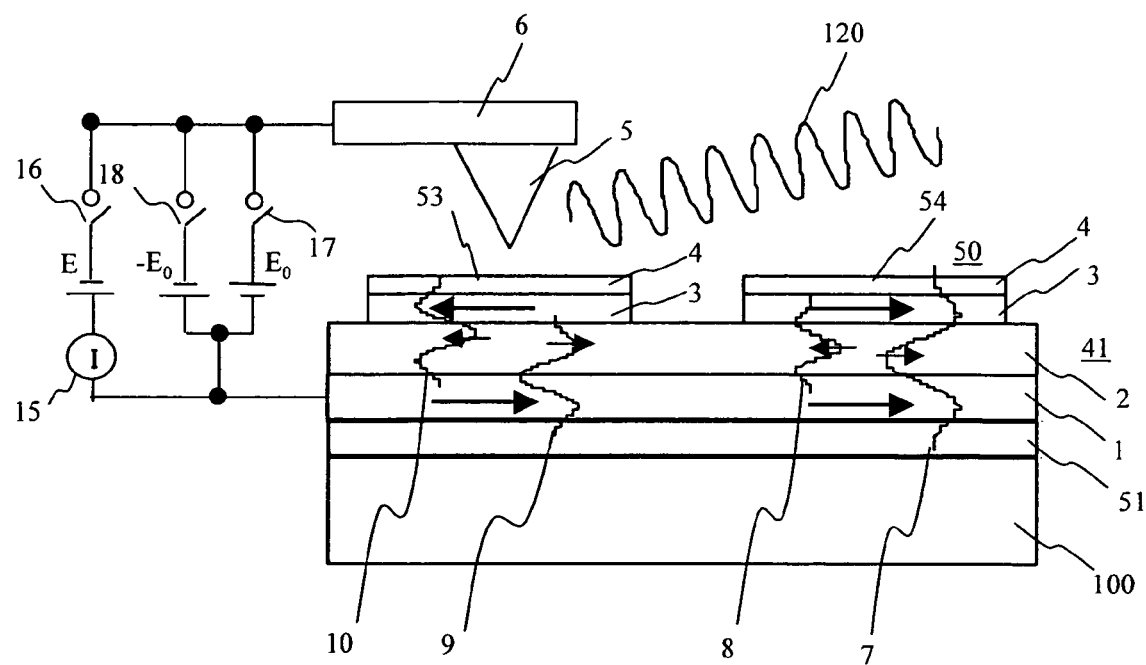
FIG. 11 is still another concept chart of the magnetization information recording/reproducing apparatus of the present invention.
Figure 12:
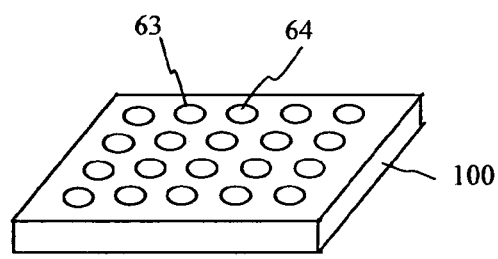
FIG. 12 is a bird-view of a recording medium provided with a plurality of nano-pillars.
Figure 13A:
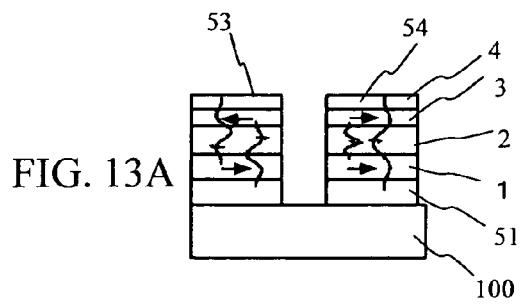
FIGS. 13A, 13B, 13C, and 13D show structures of the recording medium provided with nano-pillars.
Figure 13B:
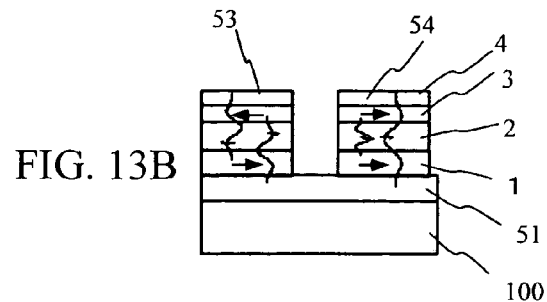
Figure 13C:
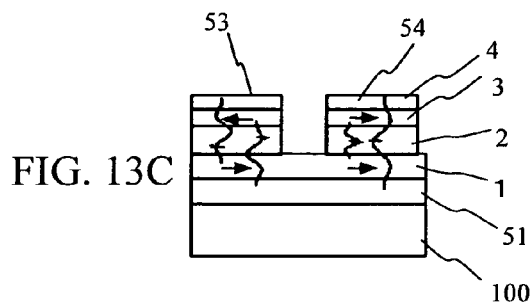
Figure 13D:
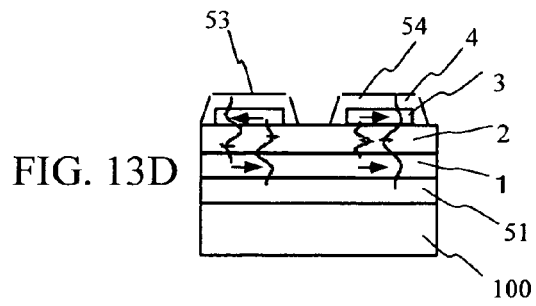

FIG. 11 shows a concept chart of the magnetization information recording/reproducing apparatus in still another (third) embodiment of the present invention. In this third embodiment, the protection film 4 and the ferromagnetic metal layer 3 included in the multilayer film are dot-patterned by a lithographic technique. The lithographic technique is employed widely for such manufacturing processes of semiconductor devices as resist patterning, ion milling, resist removing, etc. Each of those layers 4 and 3 has many nano-pillars 53 and 54 disposed at regular pitches. FIG. 12 shows a bird-view of such a recording medium having a plurality of nano-pillars 53 and 54.

FIG. 13 shows another structure of the recording medium having nano-pillars. FIG. 13A shows an example of nano-pillars formed by dot-patterning the structure of a multilayer film consisting of a protection film 4, a ferromagnetic layer 3, a nonmagnetic metal layer 2, a ferromagnetic layer 1, and an anti-ferromagnetic layer 51. FIG. 13B shows nano-pillars formed by forming a common anti-ferromagnetic layer 51 on the substrate 100 and patterning a ferromagnetic layer 1, a nonmagnetic metal layer 2, a ferromagnetic layer 3, and a protection film 4 that are laminated sequentially on the layer 51. FIG. 13C shows nano-pillars formed by patterning the nonmagnetic metal layer 2, the ferromagnetic layer 3, and the protection film 4 while the common anti-ferromagnetic layer 51 is formed on the substrate 100. FIG. 13D shows nano-pillars formed by patterning the protection film 4 and the ferromagnetic metal layer 3 included in the multilayer film. In FIG. 13D, however, the protection film 4 is formed after the ferromagnetic metal layer 3 is dot-patterned, thereby the protection film 4 comes to cover both of the top face and side faces of the ferromagnetic metal layer 3. This is a difference from the structure shown in FIG. 11.

As to be understood from a comparison between FIG. 11/13 and FIG. 10, each recording unit area of the recording medium is dot-patterned in the third embodiment and nano-pillars 53 and 54 are formed corresponding to the storage unit area. This is a difference from the second embodiment. A nano-pillar mentioned above means an nm level ellipse or square pillar formed on a plane. Just like the first embodiment, the anti-ferromagnetic layer 51 may be omitted in this third embodiment.

The electrons at the Fermi level or so in the multilayer film 41 generate a quantum well state just like the first and second embodiments. In this third embodiment, however, those electrons are blocked up in the nano-pillars 53 and 54. This is a difference from the first and second embodiments. Because the electrons in the formed quantum well state are blocked up in the nano-pillars 53 and 54 such way, each recording area is not influenced by its adjacent recording areas so easily, thereby the recording characteristic of the medium is improved.

The nano-pillars should be structured and disposed so as to correspond the recording format of the present magnetic recording disk. A gap may be left over between pillars as shown in FIG. 13 or the gap may be filled with such a nonmagnetic material as an insulator, for example, alumina or as a semiconductor, for example, Si. If a gap is left over between pillars, when the metal probe 5 passes from a nano-pillar to another according to a shift of storage bits, the metal probe 5 or nano-pillars might be damaged.

Figure 14:
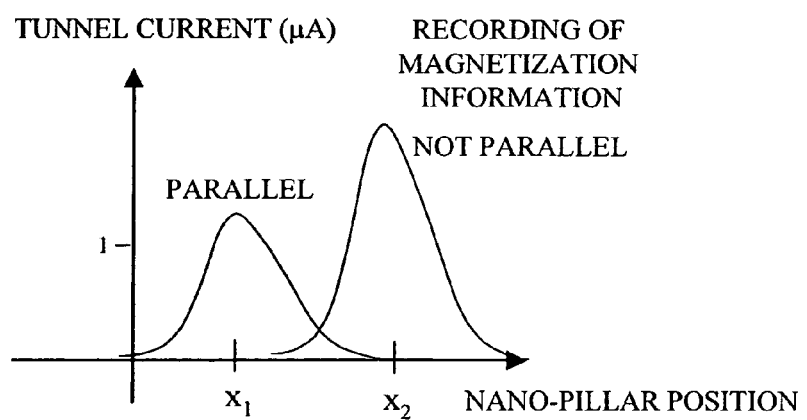
FIG. 14 is a graph for describing a tunnel current value denoted as a function of a nano-pillar position.

FIG. 14 shows a graph for describing the space distribution of the tunnel current strength when a nano-pillar is positioned at (x1 or x2). At that time, the wavelength of the incident light beam 120 is set so that the plasmon resonance increases when the magnetizing directions of the layers 1 and 3 for recording are antiparallel to each other. Consequently, when the magnetizing directions of the layers 1 and 3 for recording are antiparallel to each other (x2), the plasmon resonance increases more than when those magnetizing directions are parallel to each other (x1). When the nano-pillar is positioned between x1 and x2, no plasmon resonance occurs and the metal probe 5 and the nano-pillar are overlapped less with each other, thereby the plasmon resonance decreases. As a result, the tunnel current also decreases. This dependency of the tunnel current on its position can be used as a servo signal for recording positions.

Figure 15:
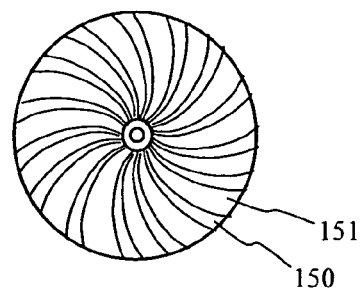
FIG. 15 is an example of a servo pattern of a rotary recording medium.

Furthermore, because not only the tunnel current, but also the light emission caused by plasmon resonance depend on position as shown in FIG. 14, the emission strength can be used as a servo signal. As shown in FIG. 15, the subject recording medium can be divided into servo zones 150 in which servo signals are written and data zones 151. Then, for example, as disclosed in the patent document 4, patterns are formed in the servo zones beforehand so that they are shifted slightly towards the track width in each sector and the signal reproducing strength output from each pattern comes to have the maximum and minimum positional deviations towards the track width and this can be used to detect such positional deviations towards the track width.

[Fourth Embodiment]

Figure 16:
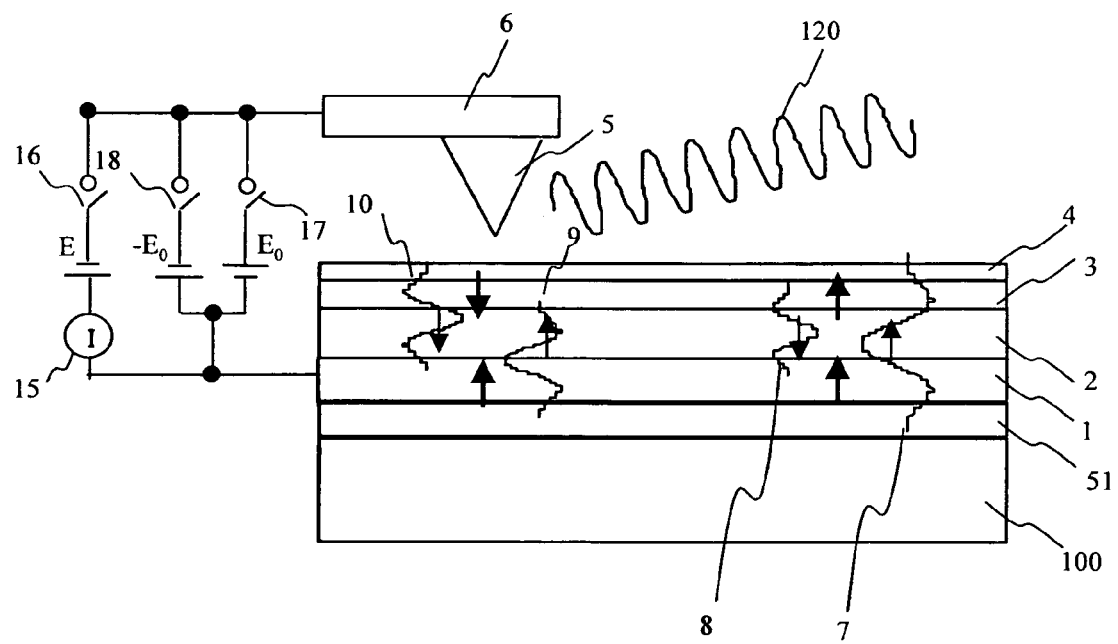
FIG. 16 is still another concept chart of the magnetization information recording/reproducing apparatus of the present invention.

FIG. 16 shows a concept chart of the magnetization information recording/reproducing apparatus in still another embodiment of the present invention. As to be understood from a comparison between FIGS. 16 and 10, while the ferromagnetic metal layers 1 and 3 are magnetized inward respectively in the second embodiment, they are magnetized vertically to the surface of the film respectively in this fourth embodiment. This is a difference between those second and fourth embodiments. And, this is possible by selecting materials having vertical magnetic anisotropy such as Co/Pt/Co, Co/Pd/Co, and Fe/Pt/Fe for the ferromagnetic metal layer 1, the nonmagnetic metal layer 2, and the ferromagnetic metal layer 3.

Each of the protection film 4 and the ferromagnetic layer 3 may have many nano-pillars 53 and 54 dot-patterned as shown in FIGS. 17A through 17E with use of a lithographic technique employed widely for manufacturing processes of semiconductors such as resist patterning, ion milling, resist removing, etc. when in forming each layer of the multilayer film, then disposed at regular pitches. FIG. 17A shows an example of nano-pillars formed by patterning the structure of the multilayer film consisting of a protection film 4, a ferromagnetic layer 3, a nonmagnetic metal layer 2, a ferromagnetic layer 1, and an anti-ferromagnetic layer 51. FIG. 17B shows nano-pillars formed by forming a common anti-ferromagnetic layer 51 on the substrate 100, then patterning the ferromagnetic layer 1, the nonmagnetic metal layer 2, the ferromagnetic layer 3, and the protection film 4 laminated sequentially on the layer 51. FIG. 17C shows nano-pillars formed by patterning the nonmagnetic metal layer 2, the ferromagnetic layer 3, and the protection film 4 after the common anti-ferromagnetic layer 51 is formed on the substrate 100. FIG. 17D shows nano-pillars formed by patterning the protection film 4 and the ferromagnetic metal layer 3 included in the multilayer film. In FIG. 17E, just like FIG. 17D, nano-pillars are formed at the protection film 4 and the ferromagnetic metal layer 3 included in the multilayer film. However, the protection film 4 is formed after the ferromagnetic metal layer 3 is dot-patterned, thereby the protection film 4 comes to cover both of the top face and side faces of the ferromagnetic metal layer 3. This is a difference from the structure shown in FIG. 17D.

Even in the case of the recording medium shown in this fourth embodiment, just like in the second embodiment, as shown in the right half of FIG. 16, if the magnetizing directions of the ferromagnetic metal layers 1 and 3 are parallel to each other, the electrons having the spin that is antiparallel to those of the layers 1 and 3 are almost localized in the nonmagnetic metal layer 2 as shown by a reference numeral 8. The electrons having the spin in the same magnetizing direction as those of the layers 1 and 3 are localized wholly in the multilayer film 41 as shown by a reference numeral 7. On the other hand, as shown in the left half of FIG. 16, if the magnetizing directions of the ferromagnetic metal layers 1 and 3 are antiparallel to each other, the state of the electrons depends on the spin and the electrons are localized in the films 1 and 2 as shown by reference numeral 9 or in the films 2 to 3 as shown by reference numeral 10.

Although the anti-ferromagnetic layer 51 is formed beneath the ferromagnetic metal layer 1 in the recording medium in the fourth embodiment, the layer 51 may be omitted just like the recording medium in the first embodiment. Both writing and reading operations using the metal probe 5 in this fourth embodiment are the same as those in the first embodiment.

[Fifth Embodiment]

FIG. 18 shows a concept chart for a structure of the magnetic recording drive of the present invention. The multilayer film 41 described in each of the embodiments described above, which consists of, for example, an antiferromagnetic layer 51, a ferromagnetic metal layer 1, a nonmagnetic metal layer 2, a ferromagnetic metal layer 3, and a protection film 4 laminated sequentially on a substrate 100, is assumed as a disk-like recording medium 20 here. The metal probe 5 that faces the multilayer film 41 is disposed in a lower portion of the slider 6 provided at the tip of the arm 23. The arm 23 is rotational around a rotary supporting shaft 24 and its position is controlled by an arm control motor 163. When the disk-like recording medium 20 is rotated around a rotary shaft 160 by a spindle motor 161, the slider floats in the air by a predetermined distance just like an ordinary magnetic disk. Consequently, the metal probe 5 comes to be disposed so as to face the multilayer film 41 at a fixed distance therebetween as described in the first to fourth embodiments.

To record information in the recording medium 20 assumed as a domain in the magnetizing direction, a voltage is applied between the surface of the substrate 100 of the recording medium 20 and the metal probe 5 through the arm 23, then an electrical field is added to between the multilayer film 41 and the metal probe 5 as described in the first to fourth embodiments. At this time, the multilayer film 41, the rotary shaft 160, and the spindle motor 161 supported on the insulating supporting base 162 are all conductive and connected to each another electrically. Therefore, a voltage can be applied and a current can be detected through a signal current line 170 connected to the spindle motor 161 or rotary shaft 160. If the signal current line 170 is connected to the rotary shaft 160, the spindle motor 161 may be disconnected from the rotary shaft 160 electrically.

Written data is output to a voltage applying device 164 from a data signal processor 167 as a written data control signal 175. The voltage applying device 164 applies a probe voltage 174 between the metal probe 5 and the multilayer film 41. When in reading information, as described in the first embodiment, a reading voltage E lower than the writing voltage ($E_0$) is applied between the metal probe 5 and the multilayer film 41 and enables the semiconductor laser 60 to irradiate a light beam to the metal probe 5 according to the laser control signal received from the laser control unit 166. The magnetizing direction written by the metal probe 5 in the recording medium 20 enables a current amplification detector 165 to read the tunnel current signal 170. The tunnel current, which is increased by the plasmon resonance caused by the incident light beam, flows between the metal probe 5 and the recording medium 20. This is because the state of the quantum well to be generated in the multilayer film 41 is determined by whether the relative magnetizing directions of the two ferromagnetic metal layers 1 and 3 are parallel or antiparallel to each other as described in the first embodiment, thereby the plasmon resonance energy comes to differ between parallel and antiparallel magnetizing directions. Read data signal 176 is processed by the data signal processor 167 and inputted/outputted as needed. The current amplification detector/servo signal generator 165 generates a servo signal 171 from a detected servo pattern and the servo signal 171 is used to control the track position of the arm 23.

Figure 19A:
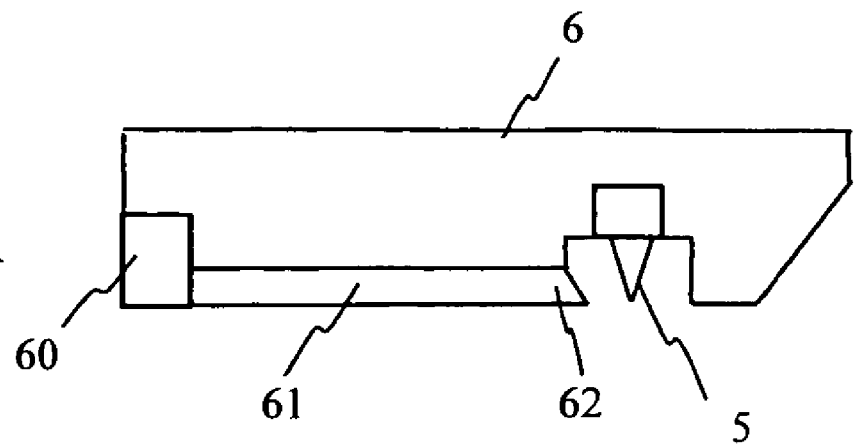
FIGS. 19A and 19B show a structure of a slider provided with a metal prove for receiving an incident light beam at its tip.
Figure 19B:
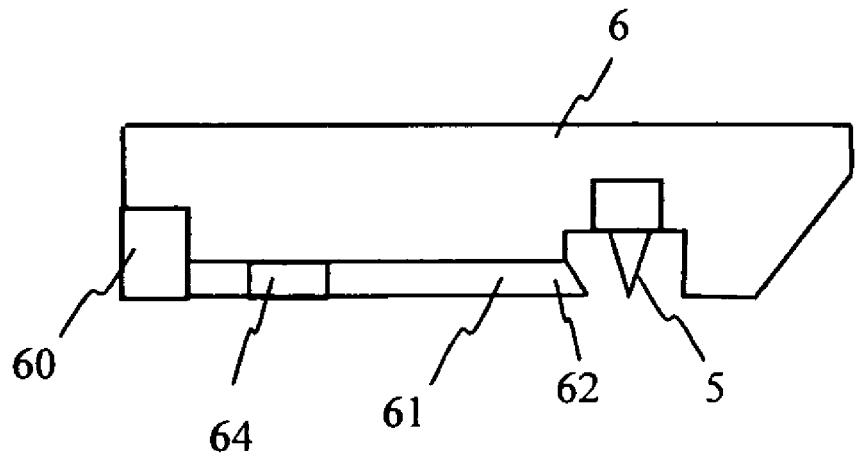

FIG. 19A shows a structure of a slider 6 having a metal probe 5 and a laser beam is irradiated onto the tip of the metal probe 5. A light beam irradiated from the semiconductor laser 60 passes a wave guide 61, then it is irradiated onto the tip of the metal probe 5. If an end face 62 of the wave guide 61 is cut at a proper angle beforehand, the light path is bent by the deflection to occur at the phase boundary, so that the laser beam is irradiated onto the tip of the metal probe 5 efficiently. It is also possible to provide the end face 62 with a proper curvature to obtain a lens effect with which the laser beam is irradiated onto the tip of the probe efficiently. As shown in FIG. 19B, if a Pockels cell 64 is disposed in the wave guide 61 to polarize and modulate the laser beam, the S/N ratio is improved. In addition, as described in the first embodiment, if the wavelength of the semiconductor laser 60 itself is modulated through current modulation, the S/N ratio is improved. In the case of such polarization/modulation and wavelength modulation, the modulation frequency is inputted to the current amplification detector 165 as a reference signal 172 so as to improve the S/N ratio and detect the tunnel current signal 170.

Means for applying a tunnel current and means for detecting the tunnel current are just required to apply a voltage between the probe 5 and the multilayer film 41 and detect the tunnel current that flows between those parts 5 and 41 according to the applied voltage.

Because the magnetic recording device is controlled according to the signal for recording the potential of the metal probe 5 in the multilayer film 41 and the magnetizing direction written according to the tunnel current increased by the plasmon resonance as described above, the same magnetic recording device as an ordinary magnetic disk drive can be realized. In this fifth embodiment, the antiferromagnetic layer 51 may be omitted from the multilayer film 41 that functions as a disk-like recording medium 20 just like in each of the above embodiments, of course.

FIG. 20 shows another structure of the slider of the magnetic recording device 20 of the present invention.

Figure 20A:
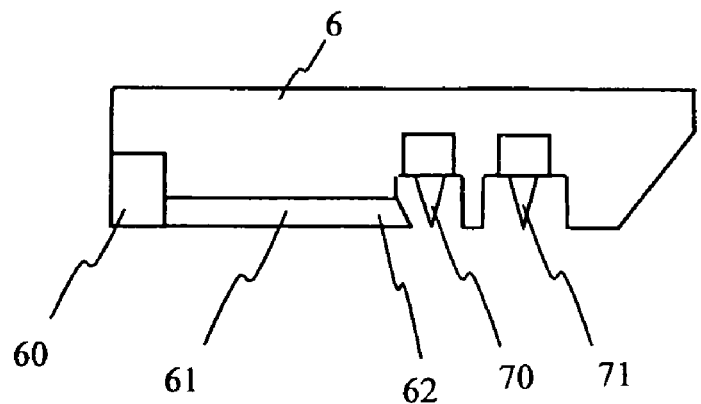
FIGS. 20A, 20B, and 20C show another structure of the slider of the magnetic recording device of the present invention.

In the slider shown in FIG. 20A, a reading metal probe 70 and a writing metal probe 71 are provided separately at the lower portion of the slider 6. The substrate side of the medium 20 is conductive and a voltage is applied to the metal probe 71 through an arm 23, thereby magnetization information is recorded in the multilayer film 41 of the medium 20 assumed as a domain in the magnetizing direction according to the applied voltage. If the rotation of the recording medium 20 and the position of the metal probe 71 are controlled just like that of an ordinary magnetic disk drive according to the signal for recording the potential of the metal probe 71, the recording medium 20 can be used just like an ordinary magnetic disk drive.

On the other hand, a magnetizing direction written on the recording medium 20 through the metal probe 71 is read according to the tunnel current, which is increased by the plasmon resonance caused by an incident light beam and flows between the metal probe 70 and the recording medium 20. The light beam irradiated from the semiconductor laser 60 passes a wave guide 61, then it is irradiated onto the tip of the metal probe 70. If an end face 62 of the wave guide 61 is cut at a proper angle beforehand, the beam is deflected, thereby the laser beam is irradiated onto the tip of the metal probe 70 efficiently. In addition, if the end face 62 is provided with a proper curvature, it generates a lens effect, thereby the laser beam is irradiated onto the tip of the metal probe 70 efficiently. And, as described in the fifth embodiment, if a Pockels cell is disposed in the wave guide 61 to cause polarization/modulation, the S/N ratio is improved. If the wavelength of the semiconductor laser 60 itself is modulated through current modulation, the S/N ratio is improved.

Figure 20B:
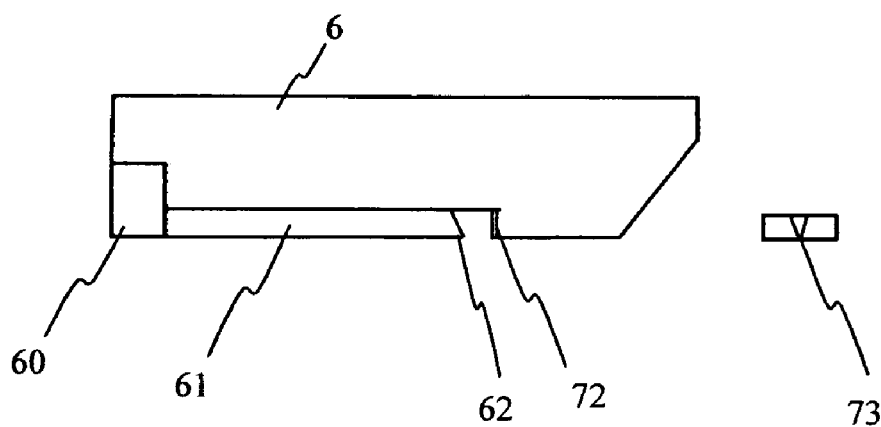

The slider shown in FIG. 20B has a sharp-pointed pattern 72 of a metal film used as a metal probe instead of the metal probe 5 used in the above embodiments. Reference numeral 73 denotes a vertical view of the sharp-pointed pattern metal film 72. The apical angle is 5° to 10°. The sharp-pointed pattern may be formed on an insulating substrate as an inverted triangle metal film pattern having a sharp tip with use of a lithographic technique employed widely in such manufacturing processes of semiconductors as resist patterning, ion milling, resist removing, etc., then bonded to the slider 6. Although the tip of the pattern is about 100 nm in size, it should preferably be smaller. The apical angle of the pattern tip should also be sharp more. The sharp-pointed pattern 72 can be formed of Au at a film thickness of 30 nm or so. It may also be formed of such metal or carbon nano-tube as Au, Pt, and W having a thickness of 5 to 100 nm.

Figure 20C:
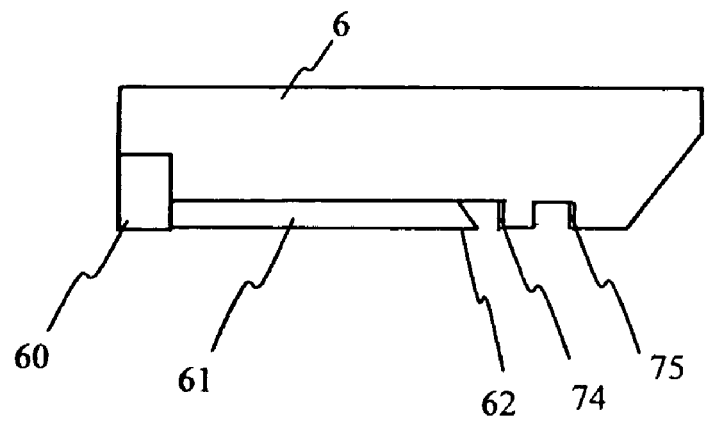

FIG. 20C shows the slider 6 having a reading sharp-pointed metal pattern 74 and a writing sharp-pointed metal pattern 75 attached at the lower portion respectively. Both writing and reading operations of the slider 6 are the same as those in the examples described above.

Figure 21A:
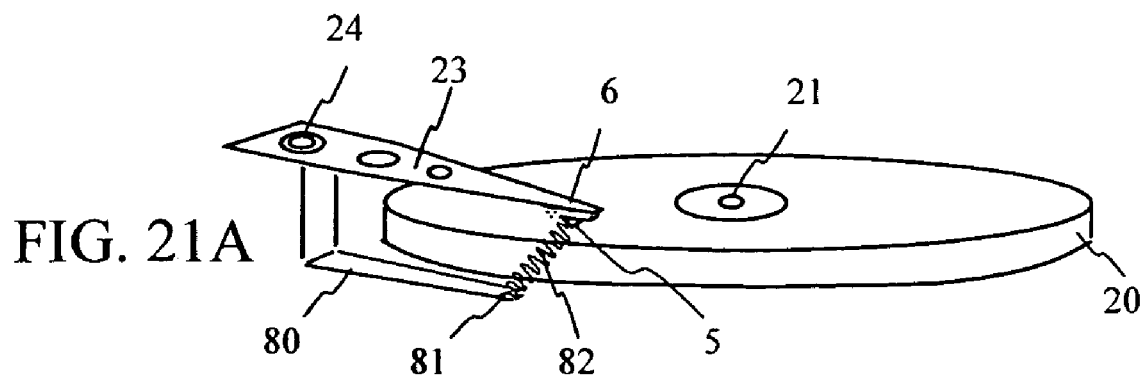
FIGS. 21A, 21B, and 21C are schematic charts of another structure of the magnetic recording device of the present invention.

FIG. 21 shows another schematic block diagram of the magnetic recording device of the present invention. As shown in FIG. 21A, the metal prove 5 is attached at the lower portion of the slider 6 provided at the tip of the arm 23. On the other hand, the semiconductor laser 81 is held by an arm 80 and disposed at the opposite side of the metal probe 5 with the recording medium 20 therebetween. The light beam 82 emitted from the semiconductor laser 81 is irradiated onto the tip of the metal probe 5 through the recording medium 20.

Figure 21B:
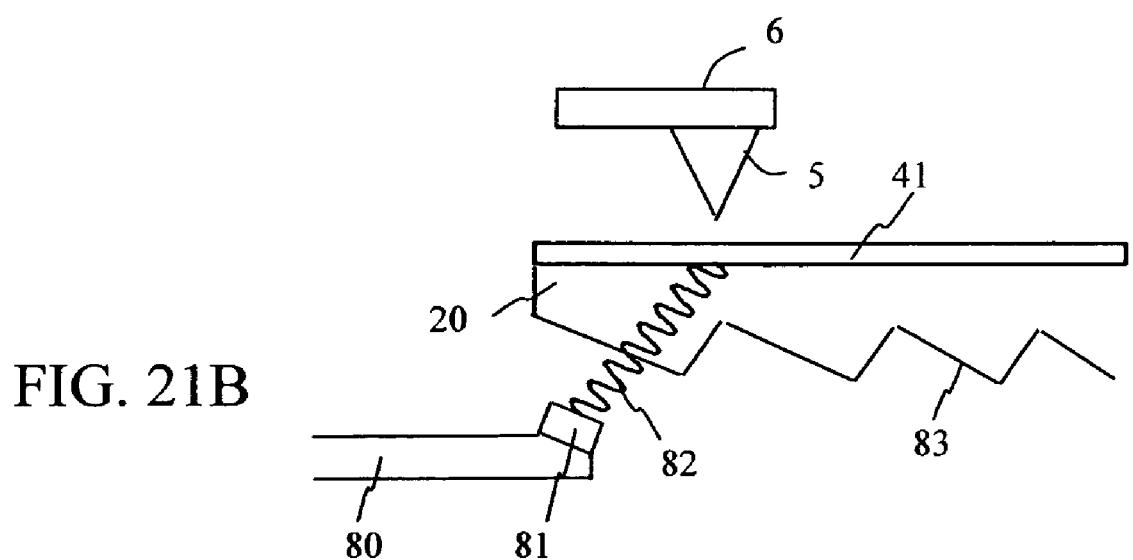
Figure 21C:
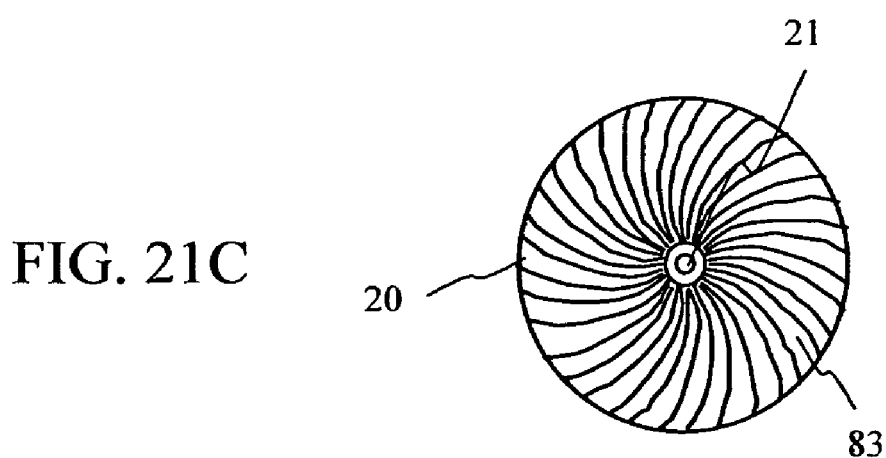

As shown in FIG. 21B, the rear side 83 of the recording medium 20 is shaved and waved at a proper fixed angle to the plane. Consequently, the light beam 82 emitted from the semiconductor laser 81 can excite the plasmon on the surface of the multilayer film 41 positioned just beneath the metal probe 5. Magnetization information written in the recording medium 20 by the metal probe 5 can be read according to the tunnel current, which is increased by plasmon resonance and flows between the metal probe 5 and the recording medium 20. FIG. 21C shows a rear view of the recording medium 20. The rear side of the recording medium 20 is shaved radially at a proper fixed angle to the plane in accordance with the movement of the arms 23 and 80, so that the light beam 82 emitted from the semiconductor laser 81 is irradiated at every spot in the recording medium 20 at a fixed angle to the plane.

Figure 22A:
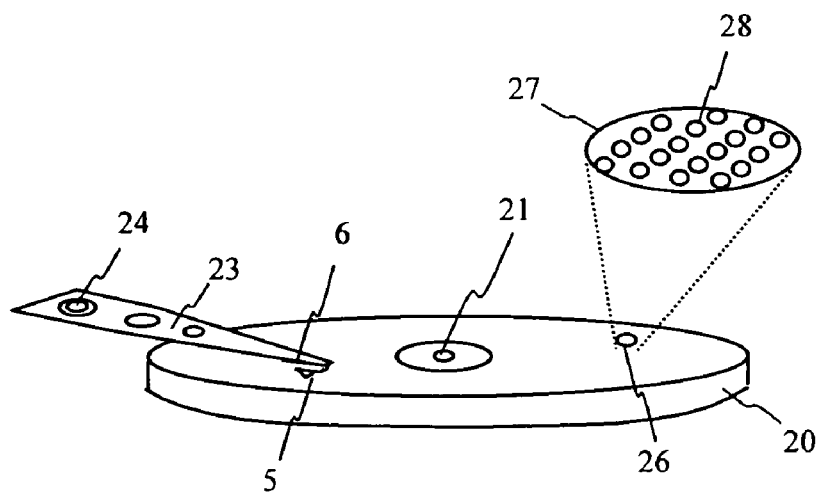
FIGS. 22A and 22B are schematic charts of still another structure of the magnetic recording device of the present invention.

FIG. 22 shows another schematic structure of the magnetic recording drive of the present invention. The disk-like recording medium 20 shown in FIG. 22A has many nano-pillars formed as shown in FIGS. 11 through 12 and those nano-pillars are composed to form each storage unit of the recording medium. FIG. 22 shows an explanatory view of the recording medium on which a plurality of nano-pillars 28 are disposed concentrically around the center of the rotation in an area 27 expanded partially from an area 26 on the recording medium 20. The metal probe 5 can keep a fixed distance from the recording medium 20 due to a lift generated by the slider attached to the tip of the arm 23, thereby the metal probe 5 writes magnetization information in the nano-pillars 28 located at desired positions. On the other hand, magnetization information written in those nano-pillars by the metal probe 5 are read according to the changes of the tunnel current increased by the plasmon resonance occurred by the incident laser beam and flowing between the metal probe 5 and each of the nano-pillars 28.

Figure 22B:
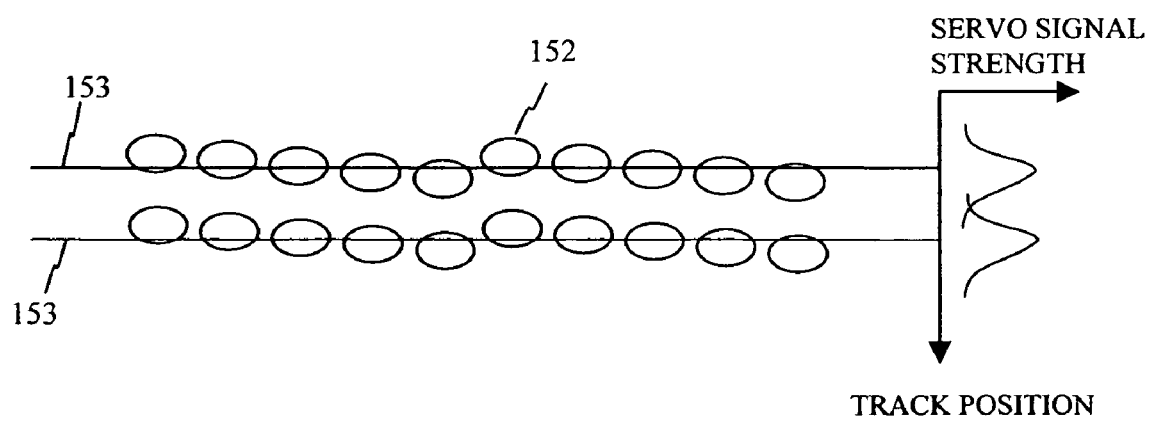

FIG. 22B is an illustration for describing the track position dependency of the servo signal strength in each servo nano-pillar pattern 152 deviated gradually from the track position 153. The servo signal may be the tunnel current increased by the plasmon resonance caused by the incident light beam and flowing between the metal probe 5 and each of the nano-pillars 28. However, the servo signal may also be the strength of the light beam emission between the metal probe 5 and each of the nano-pillars 28, which is increased by the plasmon resonance caused by the incident light beam. The track position dependency of the servo signal strength can be used to control the track position.

Figure 23:
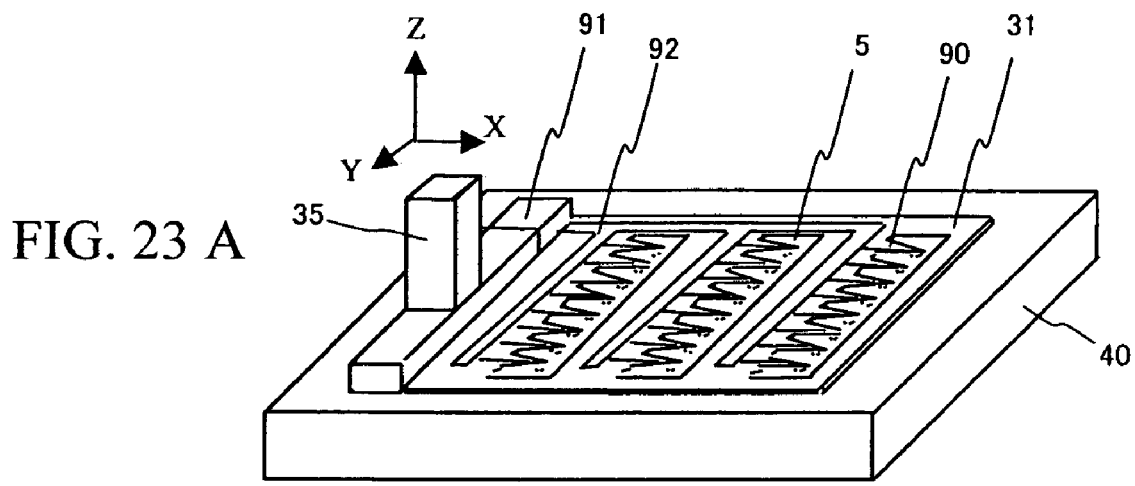
FIGS. 23A, 23B, and 23C are schematic charts of still another structure of the magnetic recording device of the present invention.

FIG. 23 is still another schematic structure of the magnetic recording drive of the present invention. The magnetic recording drive shown in FIG. 23A includes a recording medium 40 having a multilayer film 41 consisting of an anti-ferromagnetic layer 51, a ferromagnetic metal layer 1, a nonmagnetic metal layer 2, another ferromagnetic metal layer 3, and a protection layer 4 as described in the first embodiment, as well as a position control mechanism of the metal probe 5, which employs a feedback controlling method that uses a tunnel current or optical lever employed generally for the STM (Scanning Tunnel Microscope) unit and the AFM (Atomic Force Microscope) unit. The recording medium 40 may also be configured by storage units, each consisting of nano-pillars. The recording medium 40 may omit the anti-ferromagnetic layer 51.

Figure 23B:
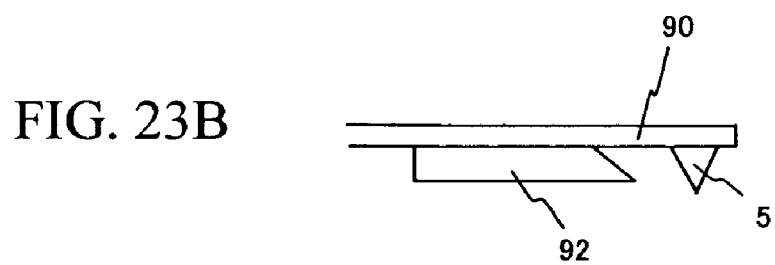
Figure 23C:
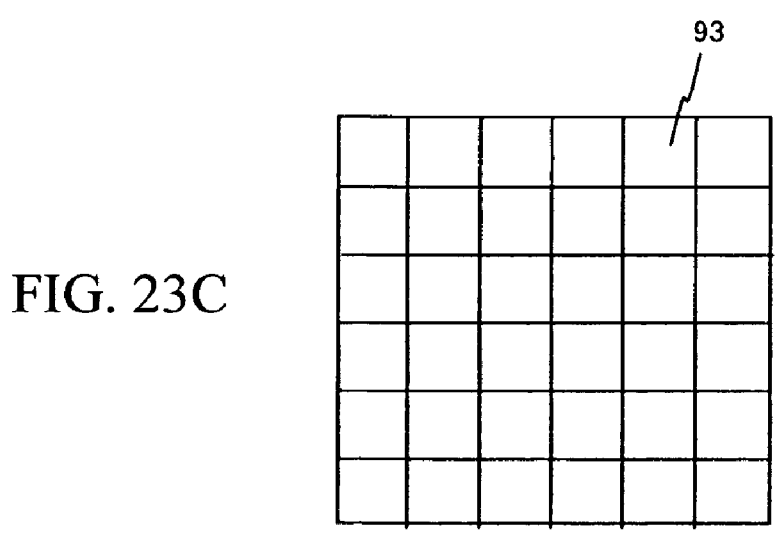

The recording medium 40 is fixed and a substrate 31 is provided on a surface on which the multilayer film 40 of the medium 40 is formed. The substrate 31 faces the medium 40. A plurality of plate springs 90 are provided on the substrate 31 so as to be disposed in both X and Y directions. As shown in FIG. 23B, a metal probe 5 is provided at the tip of each of the plate springs 90 and a light beam emitted from a semiconductor laser 91 is irradiated onto the tip of each metal probe 5 through a wave guide 92. The substrate 31 can be moved by a driving mechanism 35 on the plane horizontally (X and Y directions) and vertically (Z direction) on the recording medium 40. The movement of the substrate 31 relatively with the recording medium 40 is limited within the maximum range of each metal probe 5 in the X and Y directions, that is, up to a position just in front of the storage area 93 in/from which data is written/read by the adjacent metal probe 5. FIG. 23C shows a storage area (one cell) to be scanned by one metal probe 5. The recording area of the medium 40 is divided into such storage areas 93 and each of the plurality of metal probes 5 covers one of the storage areas 90 so as to record/reproduce magnetization information on/from the recording medium 40. If input signals are serial ones, those serial signals are translated into parallel signals in an existing serial/parallel translation circuit so that the signals are written by a plurality of metal probes concurrently. Signals reproduced by a plurality of metal probes are translated into serial signals in a parallel/serial translation circuit, then transmitted to a signal processing circuit provided in a subsequent process step. The distance between each metal probe 5 and the multilayer film 41 of the recording medium 40 can be controlled by, for example, a mechanism used for an optical lever type AFM as described in the embodiments VI and VII in the patent document 2.

Magnetization information is written in the recording medium 40 in the direction corresponding to the information signal by applying an electrical field between the recording medium 40 and each selected metal probe 5. The magnetizing direction written in the recording medium 40 is read according to the tunnel current increased by the plasmon resonance caused by the incident light beam irradiated from the semiconductor laser 91 onto the tip of each selected metal probe 5 through the wave guide 92.

What is claimed is:

1. A method for recording/reproducing magnetization information, comprising the steps of:

positioning a metal probe so as to face a multilayer film that includes a first ferromagnetic metal layer, a non-magnetic metal layer formed on said first ferromagnetic metal layer, and a second ferromagnetic metal layer formed on said non-magnetic metal layer;

applying a voltage between said multilayer film and said metal probe to magnetize an area of said multilayer film that faces said metal probe according to said applied voltage, thereby writing magnetization information in said magnetized area;

injecting a light beam between said metal probe and said multilayer film to induce plasmon there while detecting a tunnel current that flows between said metal probe and said multilayer film; and reading magnetization information written in said multilayer film according to said detected tunnel current.

2. The method according to claim 1:

wherein the wavelength of said light beam injected between said metal probe and said multilayer film is a wavelength that causes plasmon resonance when the magnetizing directions of said first and second ferromagnetic metal layers are parallel to each other or a wavelength that causes plasmon resonance when the magnetizing directions of said first and second ferromagnetic metal layers are antiparallel to each other.

3. The method according to claim 2:

wherein said light beam injected between said metal probe and said multilayer film is polarized and modulated by a fixed frequency to detect the modulation frequency component of said tunnel current in said step of detecting said tunnel current.

4. The method according to claim 1:

wherein the wavelength of said light beam injected between said metal probe and said multilayer film is modulated by a fixed frequency between said wavelength that causes plasmon resonance when the magnetizing directions of said first and second ferromagnetic metal layers are parallel to each other and said wavelength that causes plasmon resonance when the magnetizing directions of said first and second ferromagnetic metal layers are antiparallel to each other so as to make phase sensitive detection of said tunnel current with use of said modulation frequency in said step of detecting said tunnel current.

5. The method according to claim 1:

wherein the magnetizing direction of said first and second ferromagnetic metal layers are changed locally so as to become parallel to each other or not become parallel to each other according to said applied voltage in said step of writing said magnetization information.

6. An apparatus for recording/reproducing magnetization information, comprising:

a recording medium that includes a multilayer film consisting of a first ferromagnetic metal layer, a non-magnetic metal layer formed on said first ferromagnetic metal layer, and a second ferromagnetic metal layer formed on said non-magnetic metal layer;

a metal probe disposed so as to face said recording medium;

voltage applying means for applying a voltage between said metal probe and said recording medium; and light injecting means for injecting a light beam between said metal probe and said recording medium.

7. The apparatus according to claim 6:

wherein said apparatus further includes injects a light beam having a wavelength that causes plasmon resonance in an object when the magnetizing directions of said first and second ferromagnetic metal layers are parallel or a wavelength that causes plasmon resonance when the magnetizing directions of said first and second ferromagnetic metal layers are antiparallel to each other; and wherein said light injecting means includes means for detecting the tunnel current flowing between said metal probe and said recording medium.

8. The apparatus according to claim 7:

wherein said light injecting means modulates the polarized state of said injection light beam with a fixed frequency; and wherein said light injecting means includes means for detecting said modulation frequency component of said detected tunnel current.

9. The apparatus according to claim 6:

wherein said light injecting means modulates the wavelength of an injection light with a fixed frequency between said wavelength that causes plasmon resonance when the magnetizing directions of said first and second ferromagnetic metal layers are parallel to each other and said wavelength that causes plasmon resonance when the magnetizing directions of said first and second ferromagnetic metal layers are antiparallel to each other; and wherein said light injecting means includes:

means for detecting a tunnel current flowing between said metal probe and said recording medium; and means for making phase sensitive detection of said detected tunnel current with use of said modulation frequency.

10. The apparatus according to claim 6:

wherein said apparatus further includes means for driving said recording medium rotationally and a slider provided at the tip of an arm having one end supported rotationally and the other end extended to said recording medium formed like a disk; and wherein said metal probe is disposed on the bottom face of said slider.

11. The apparatus according to claim 10:

wherein said slider includes means for guiding and injecting a semiconductor laser beam around said tip of said metal probe.

12. The apparatus according to claim 11:

wherein said metal probe is formed of a metal film structured to have a sharp-pointed tip pattern.

13. The apparatus according to claim 6:

wherein said second ferromagnetic metal layer is divided into a plurality of spaces, each corresponding to a unit of information to be recorded.

14. The apparatus according to claim 6:

wherein said recording medium includes an anti-ferromagnetic layer formed beneath said first ferromagnetic metal layer.

15. The apparatus according to claim 6:

wherein a plurality of said metal probes are disposed at predetermined pitches and each of said plurality of metal probes records/reproduces magnetization information.

* * * * *